United States Patent
Yoshimi et al.

(10) Patent No.: US 7,829,859 B2
(45) Date of Patent: Nov. 9, 2010

(54) RADIATION DETECTING CASSETTE AND RADIATION IMAGE CAPTURING SYSTEM

(75) Inventors: Takuya Yoshimi, Kanagawa (JP); Eiichi Kito, Kanagawa (JP); Tsuyoshi Tanabe, Kanagawa (JP); Takeshi Kuwabara, Kanagawa (JP); Kazuharu Ueta, Tokyo (JP); Makoto Iriuchijima, Gunma (JP); Yasunori Ohta, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 165 days.

(21) Appl. No.: 12/219,733

(22) Filed: Jul. 28, 2008

(65) Prior Publication Data

US 2009/0026378 A1    Jan. 29, 2009

(30) Foreign Application Priority Data

Jul. 27, 2007    (JP)    ............................. 2007-195538
Jun. 26, 2008    (JP)    ............................. 2008-167094

(51) Int. Cl.
G01T 1/00    (2006.01)

(52) U.S. Cl. ................................................. 250/370.08

(58) Field of Classification Search ............. 250/336.1, 250/370.04, 370.08, 370.09; 378/98.8
See application file for complete search history.

(56) References Cited

U.S. PATENT DOCUMENTS

| | | | |
|---|---|---|---|
| 7,309,159 | B2 | 12/2007 | Watanabe |
| 2004/0079908 | A1* | 4/2004 | Ohkubo .................... 250/582 |
| 2004/0252613 | A1* | 12/2004 | Iwakiri .................... 369/53.12 |
| 2006/0054822 | A1* | 3/2006 | Tsuchino ................. 250/336.1 |
| 2008/0049901 | A1* | 2/2008 | Tamakoshi ................ 378/98.2 |

FOREIGN PATENT DOCUMENTS

| | | |
|---|---|---|
| JP | 07-140255 | 6/1995 |
| JP | 2000-105297 | 4/2000 |
| JP | 2003-172783 | 6/2003 |
| JP | 2005-007086 | 1/2005 |
| JP | 2005-173432 | 6/2005 |
| JP | 2005-208269 | 8/2005 |
| JP | 2006-122219 | 5/2006 |
| JP | 2006-158508 | 6/2006 |

* cited by examiner

*Primary Examiner*—David P Porta
*Assistant Examiner*—Mark R Gaworecki
(74) *Attorney, Agent, or Firm*—Jean C. Edwards, Esq.; Akerman Senterfitt

(57) ABSTRACT

Power supply switches are disposed on respective side walls of a casing of a radiation detecting cassette, which are held out of contact with a patient when a radiation image of the patient is captured. When a surgeon or a radiological technician turns one of the power supply switches on or off, a battery starts or stops supplying electric power to a radiation detector, a cassette controller, and a transceiver.

8 Claims, 8 Drawing Sheets

RADIATION DETECTING CASSETTE AND RADIATION IMAGE CAPTURING SYSTEM

CROSS-REFERENCE TO RELATED APPLICATIONS

The present application claims priority from Japanese Patent Application Nos. 2007-195538, filed Jul. 27, 2007, and 2008-167094, filed Jun. 26, 2008, the contents of both of which are herein incorporated by reference in their entirety.

BACKGROUND OF THE INVENTION

1. Field of the Invention

The present invention relates to a radiation detecting cassette having a radiation conversion panel for detecting radiation that has passed through a subject and converting the detected radiation into radiation image information. The present invention also concerns a radiation image capturing system having such a radiation detecting cassette.

2. Description of the Related Art

In the medical field, radiation image capturing apparatus have widely been used which apply a radiation to a subject and guide the radiation that has passed through the subject to a radiation conversion panel, which captures a radiation image from the radiation. Known forms of the radiation conversion panel include a conventional radiation film for recording a radiation image by way of exposure, and a stimulable phosphor panel for storing radiation energy representing a radiation image in a phosphor and reproducing the radiation image as stimulated light by applying stimulating light to the phosphor. The radiation film with the recorded radiation image is supplied to a developing device to develop the radiation image, or the stimulable phosphor panel is supplied to a reading device in order to read the radiation image as a visible image.

In an operating room or the like, it is necessary to read recorded radiation images immediately from the radiation conversion panel after the radiation image has been captured, for the purpose of quickly and appropriately treating the patient. As a radiation conversion panel that meets such a requirement, there has been developed a radiation detector having a solid-state detector for converting radiation directly into electric signals, or for converting radiation into visible light with a scintillator and then converting the visible light into electric signals, so as to read the detected radiation image.

According to some known systems, a radiation conversion panel, a radio communication means, and a battery are housed together in a radiation detecting cassette. The radiation detecting cassette is designed to avoid wasteful power consumption of the battery, which energizes the radiation conversion panel and the radio communication means (see, for example, Japanese Laid-Open Patent Publication No. 2003-172783, Japanese Laid-Open Patent Publication No. 2005-007086, Japanese Laid-Open Patent Publication No. 2005-208269, Japanese Laid-Open Patent Publication No. 2005-173432, Japanese Laid-Open Patent Publication No. 2006-122219, and Japanese Laid-Open Patent Publication No. 2006-158508).

Specifically, Japanese Laid-Open Patent Publication No. 2003-172783 discloses that when a power supply switch disposed on an upper surface, serving as a irradiation surface, of the radiation detecting cassette is turned on, the battery supplies electric power to various components inside the radiation detecting cassette.

Japanese Laid-Open Patent Publication No. 2005-007086 and Japanese Laid-Open Patent Publication No. 2005-208269 disclose that information concerning the remaining amount of stored battery energy is transmitted from a radiation detecting cassette to a controller, wherein the controller inhibits a radiation image from being captured based on the received information.

Japanese Laid-Open Patent Publication No. 2005-173432 reveals that electric power is not supplied from the battery to the radiation conversion panel while a doctor or radiological technician is gripping a handle disposed on the casing of the radiation detecting cassette, whereas electric power is supplied from the battery to the radiation conversion panel when the doctor or radiological technician releases the handle.

Japanese Laid-Open Patent Publication No. 2006-122219 reveals a radiation detecting cassette, which transmits radiation image information (reduced image information) and corrective information to a controller. The controller processes the reduced image information based on the corrective information, so that the radiation detecting cassette reduces power consumption as required, in order to correct the reduced image information.

Japanese Laid-Open Patent Publication No. 2006-158508 discloses that when a mobile image capturing apparatus including a radiation detecting cassette is in motion, unwanted power consumption is prohibited for functions which are not used while the mobile image capturing apparatus is moving.

On the radiation detecting cassette, the power supply switch should be turned on immediately before a radiation image is captured in order to minimize battery power consumption.

According to Japanese Laid-Open Patent Publication No. 2003-172783, however, it is difficult to turn the power supply switch on immediately before the radiation image is captured because, before the radiation image is captured, the subject (patient) is held against an upper surface of the radiation detecting cassette on which the power supply switch also is mounted.

Japanese Laid-Open Patent Publication No. 2005-007086, Japanese Laid-Open Patent Publication No. 2005-208269, Japanese Laid-Open Patent Publication No. 2005-173432, Japanese Laid-Open Patent Publication No. 2006-122219, and Japanese Laid-Open Patent Publication No. 2006-158508 do not disclose any structures or methods for minimizing battery power consumption by turning a power supply switch on immediately before a radiation image is captured.

SUMMARY OF THE INVENTION

It is an object of the present invention to provide a radiation detecting cassette, which is capable of capturing a radiation image while minimizing battery power consumption, as well as to provide a radiation image capturing system having such a radiation detecting cassette.

A radiation detecting cassette according to the present invention includes a radiation conversion panel for detecting radiation that has passed through a subject and converting the detected radiation into radiation image information, a wireless communication unit for performing wireless communications with an external source, a battery for energizing the radiation conversion panel and the wireless communication unit, and a plurality of switches for controlling supply of electric power from the battery to the radiation conversion panel and to the wireless communication unit, wherein the radiation conversion panel, the wireless communication unit, and the battery are housed in a substantially rectangular casing, with the switches being disposed on respective side walls of the casing, which are held out of contact with the subject when a radiation image of the subject is captured. When either one of the switches is operated, the battery starts or stops supplying electric power to the wireless communication unit and/or to the radiation conversion panel.

According to the present invention, the switches are disposed on respective side walls of the casing, which are held out of contact with the subject when a radiation image of the subject is captured. Since the switches are prevented from coming into contact with the subject even if the subject moves when a radiation image of the subject is captured, the radiation image capturing system can reliably capture radiation image of the subject.

The switches are disposed on respective side walls of the casing, which are held out of contact with the subject when a radiation image of the subject is captured. When a surgeon or radiological technician turns on or off one of the switches, the battery starts or stops supplying electric power to the wireless communication unit and the radiation conversion panel. It is thus possible to turn on the switch immediately before the radiation image capturing system captures the radiation image of the subject, so that power consumption of the battery is reliably minimized.

The above and other objects, features, and advantages of the present invention will become more apparent from the following description when taken in conjunction with the accompanying drawings in which a preferred embodiment of the present invention are shown by way of illustrative example.

DESCRIPTION OF THE PREFERRED EMBODIMENTS

Figure 1:
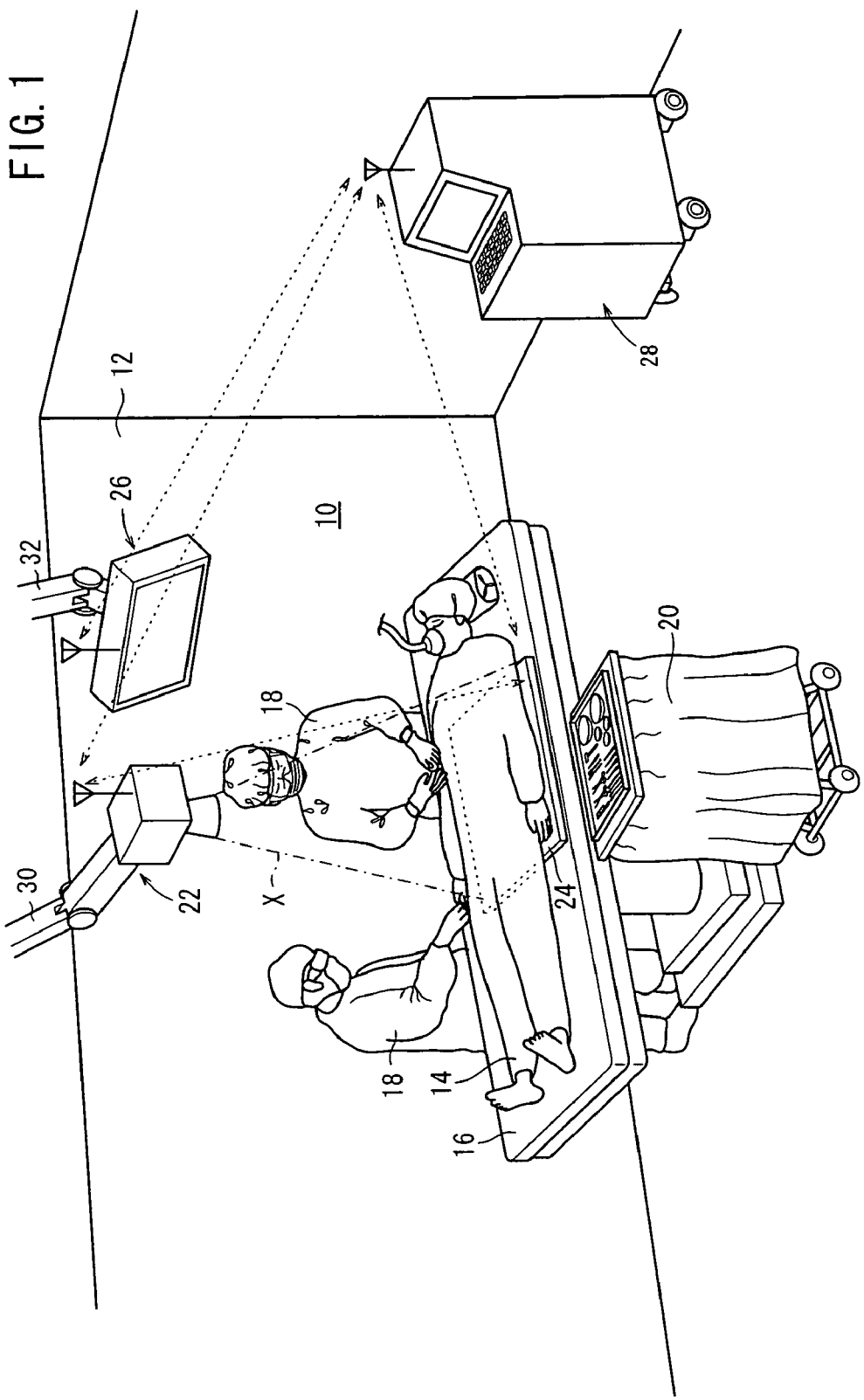
FIG. 1 is a perspective view of an operating room incorporating a radiation image capturing system according to an embodiment of the present invention.

As shown in FIG. 1, an operating room 12 incorporating a radiation image capturing system 10 according to a preferred embodiment of the present invention includes a surgical table (bed) 16 for a patient 14 to lie thereon, and an instrument table 20 disposed to one side of the surgical table 16 for placing thereon various tools and instruments to be used by surgeons 18 operating on the patient 14. The surgical table 16 is surrounded by various apparatus required for performing surgical operations, including an anesthesia apparatus, an aspirator, an electrocardiograph, a blood pressure monitor, etc.

The radiation image capturing system 10 includes an image capturing apparatus 22 for irradiating the patient 14 with radiation X at a dose according to image capturing conditions, a radiation detecting cassette 24 housing therein a radiation detector (radiation conversion panel) 40 (see FIGS. 2 through 6) for detecting radiation X that has passed through the patient 14, a display device 26 for displaying a radiation image based on radiation X detected by the radiation detector 40, and a console (controller) 28 for controlling the image capturing apparatus 22, the radiation detecting cassette 24, and the display device 26. The image capturing apparatus 22, the radiation detecting cassette 24, the display device 26, and the console 28 send and receive signals by way of UWB (Ultra-Wide Band) wireless communications.

The image capturing apparatus 22 is coupled to a universal arm 30, so as to be movable to a desired position for capturing images at a desired area of the patient 14, and also to be retractable to an out of the way position while the surgeons 18 are performing a surgical operation on the patient 14. Similarly, the display device 26 is coupled to a universal arm 32, so as to be movable to a position where the surgeons 18 can easily confirm the captured radiation image, which is displayed on the display device 26.

Figure 2:
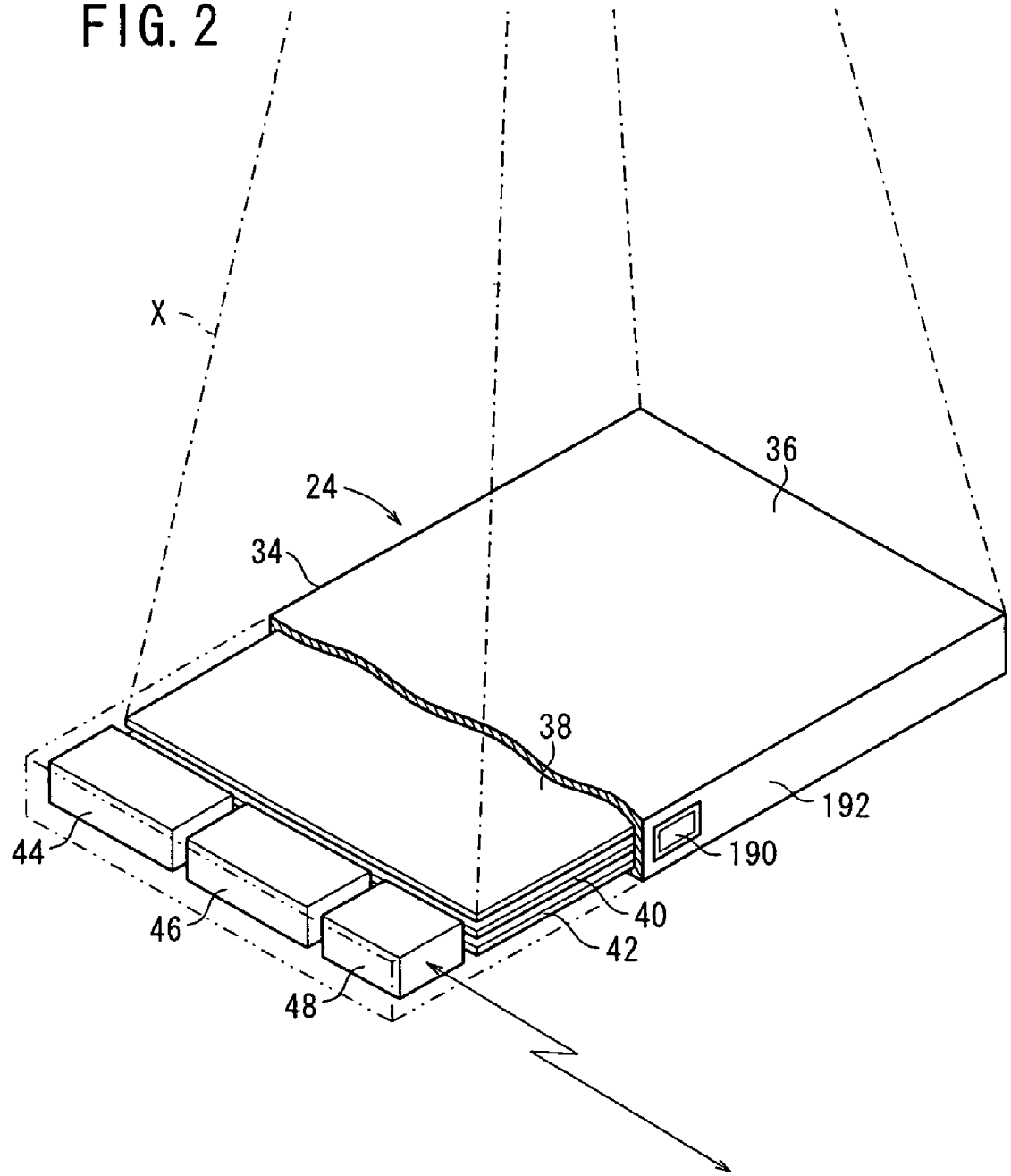
FIG. 2 is a perspective view, partly cut away, showing internal structural details of a radiation detecting cassette according to the present invention.

FIG. 2 shows in perspective the internal structural details of the radiation detecting cassette 24. As shown in FIG. 2, the radiation detecting cassette 24 comprises a casing 34 made of a material that is permeable to radiation X. The casing 34 houses therein a grid 38 for removing scattered rays from the radiation X from the patient 14, a radiation detector 40 for detecting radiation X that has passed through the patient 14, and a lead plate 42 for absorbing back scattered rays from the radiation X. The grid 38, the radiation detector 40, and the lead plate 42 are successively arranged in that order from an irradiated surface 36 of the casing 34, which is irradiated with radiation X. The irradiated surface 36 of the casing 34 may also be constructed so as to form the grid 38.

The casing 34 also houses therein a battery 44, which makes up a power supply for the radiation detecting cassette 24, a cassette controller 46 for energizing the radiation detector 40 with electric power supplied from the battery 44, and a transceiver (wireless communication unit) 48 for sending and receiving signals, including information of the radiation X that is detected by the radiation detector 40, to and from the console 28. A shield plate of lead or the like should preferably be placed over the side surfaces of the cassette controller 46 and the transceiver 48 under the irradiated surface 36 of the casing 34, so as to protect the cassette controller 46 and the transceiver 48 against damage, which would otherwise be caused if the cassette controller 46 and the transceiver 48 were irradiated with radiation X.

Figure 3:
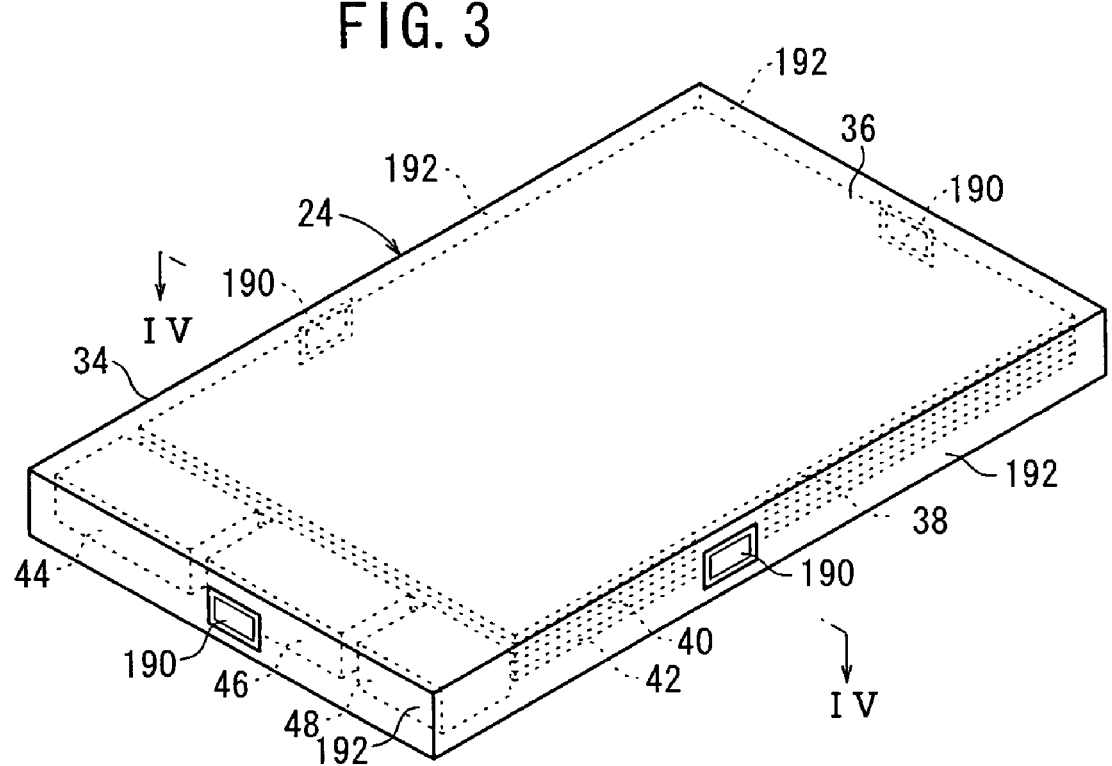
FIG. 3 is a perspective view of the radiation detecting cassette shown in FIG. 2.
Figure 4:
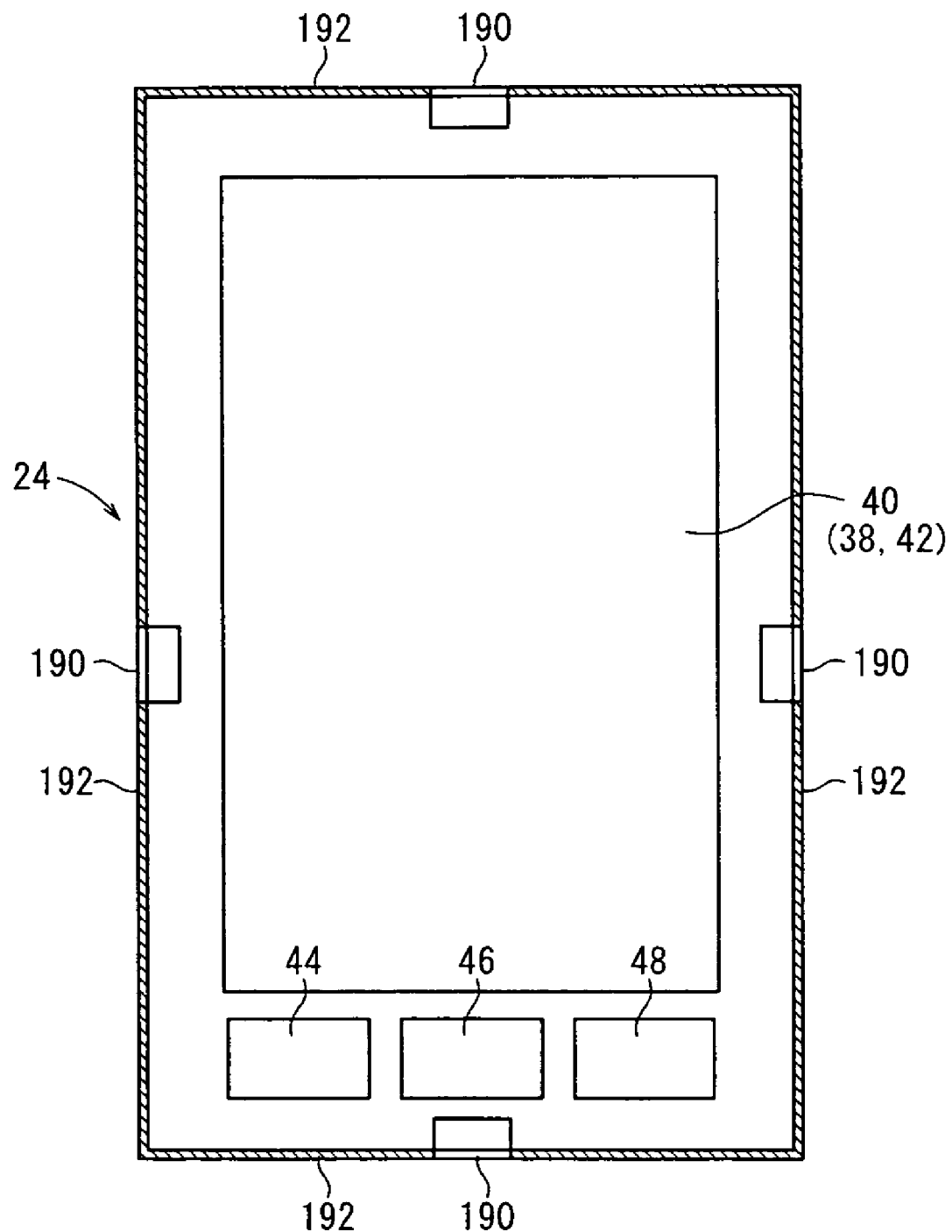
FIG. 4 is a cross-sectional view taken along line IV-IV of FIG. 3.

FIG. 3 shows in perspective the radiation detecting cassette 24, whereas FIG. 4 shows the radiation detecting cassette 24 in cross section. As shown in FIGS. 2 through 4, the casing 34 supports centrally on four side walls 192 thereof respective power supply switches 190 for controlling supply of electric power from the battery 44 to the radiation detector 40, the cassette controller 46, and the transceiver 48. The side walls 192 remain out of contact with the patient 14 (see FIG. 1) when a radiation image of the patient 14 is captured by the image capturing apparatus 22. When either one of the power supply switches 190 is operated by the surgeons 18 or by a radiological technician, the supply of electric power from the battery 44 to the radiation detector 40, the cassette controller 46, and the transceiver 48 is started or stopped.

Figure 5:
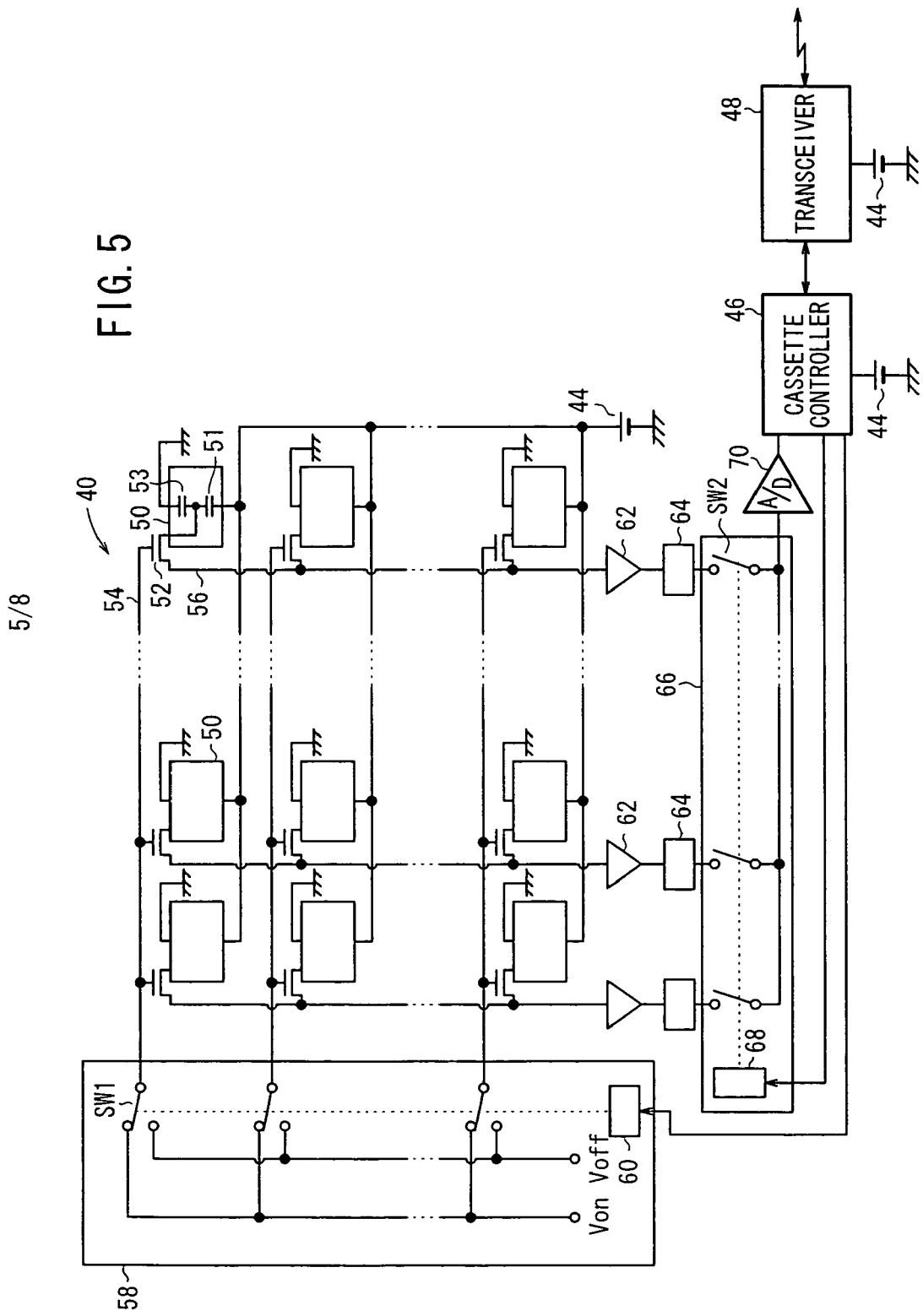
FIG. 5 is a block diagram of a circuit arrangement of a radiation detector used in the radiation detecting cassette shown in FIG. 2.

FIG. 5 shows in block form a circuit arrangement of the radiation detector 40. As shown in FIG. 5, the radiation detector 40 comprises an array of thin-film transistors (TFTs) 52 arranged in rows and columns, a photoelectric conversion layer 51 made of a material such as amorphous selenium (a-Se) for generating electric charges upon detection of radiation X, the photoelectric conversion layer 51 being disposed over the array of TFTs 52, and an array of storage capacitors 53 connected to the photoelectric conversion layer 51. When radiation X is applied to the radiation detector 40, the photoelectric conversion layer 51 generates electric charges, and the storage capacitors 53 store the generated electric charges. Then, the TFTs 52 are turned on, each row at a time, to read the electric charges from the storage capacitors 53 as an image signal. In FIG. 5, the photoelectric conversion layer 51 and one of the storage capacitors 53 are shown as making up a pixel 50, wherein the pixel 50 is connected to one of the TFTs 52. Details of the other pixels 50 are omitted from illustration. Since amorphous selenium tends to change its structure and lose its functionality at high temperatures, amorphous selenium needs to be used within a certain temperature range. Therefore, some means for cooling the radiation detector 40 should preferably be provided in the radiation detecting cassette 24.

The TFTs 52, which are connected to the respective pixels 50, are also connected to respective gate lines 54 extending in parallel to the rows, and to respective signal lines 56 extending in parallel to the columns. The gate lines 54 are connected to a line scanning driver 58, and the signal lines 56 are connected to a multiplexer 66 serving as a reading circuit. The gate lines 54 are supplied with control signals Von, Voff from the line scanning driver 58 for turning on and off the TFTs 52 along the rows. The line scanning driver 58 comprises a plurality of switches SW1 for switching between the gate lines 54, and an address decoder 60 for outputting a selection signal for selecting one of the switches SW1 at a time. The address decoder 60 is supplied with an address signal from the cassette controller 46.

The signal lines 56 are supplied with electric charges, which have been stored in the storage capacitors 53 of the pixels 50, through the TFTs 52 arranged in the columns. The electric charges supplied to the signal lines 56 are amplified by amplifiers 62 connected respectively to the signal lines 56. The amplifiers 62 are connected through respective sample and hold circuits 64 to the multiplexer 66. The multiplexer 66 comprises a plurality of switches SW2 for successively switching between the signal lines 56, and an address decoder 68 for outputting a selection signal for selecting one of the switches SW2 at a time. The address decoder 68 is supplied with an address signal from the cassette controller 46. The multiplexer 66 has an output terminal connected to an A/D converter 70. A radiation image signal generated by the multiplexer 66 based on the electric charges from the sample and hold circuits 64 is converted by the A/D converter 70 into a digital image signal representing radiation image information, which is supplied to the cassette controller 46.

Figure 6:
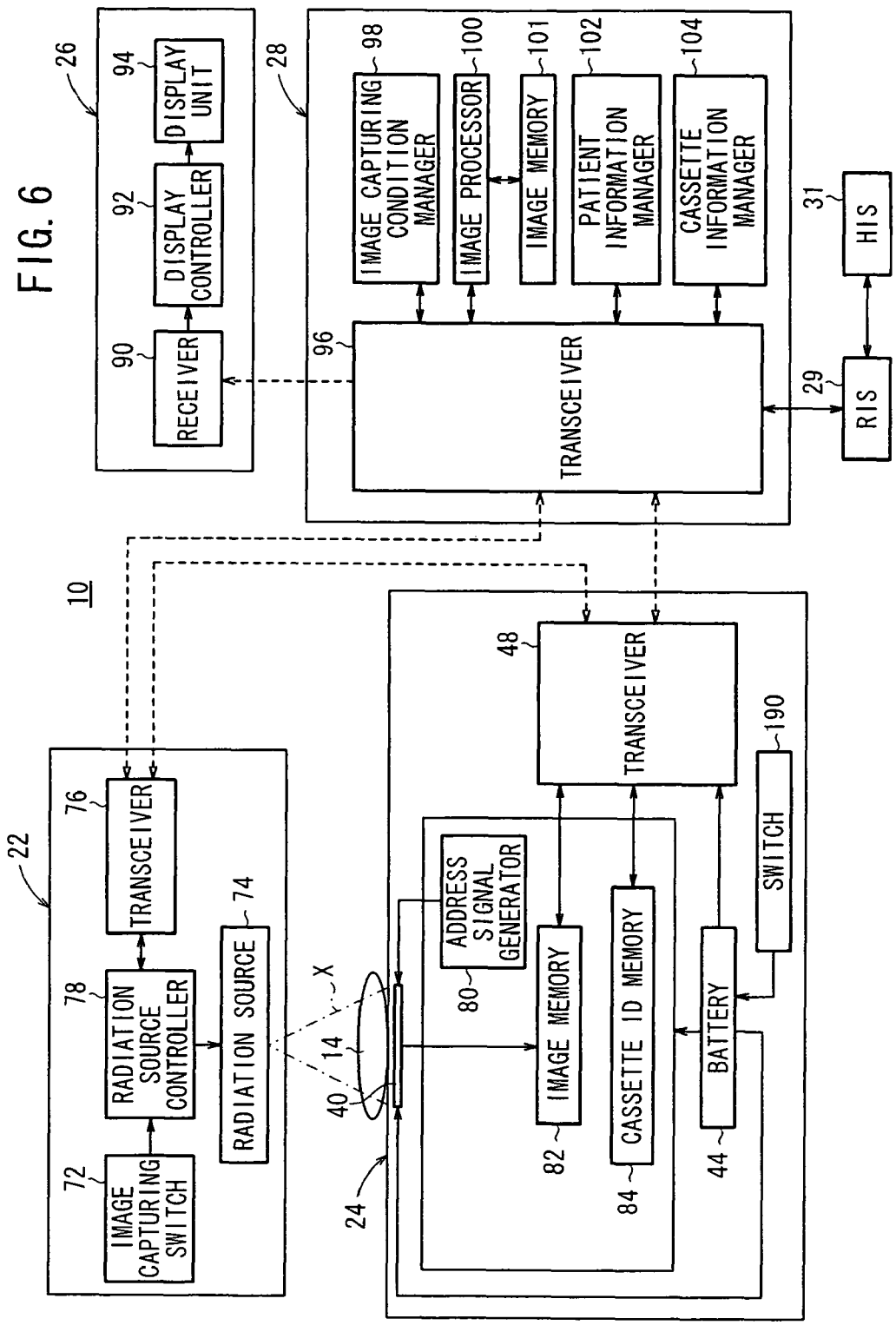
FIG. 6 is a block diagram of the radiation image capturing system shown in FIG. 1.

FIG. 6 shows in block form the radiation image capturing system 10, which comprises the image capturing apparatus 22, the radiation detecting cassette 24, the display device 26, and the console 28. The console 28 is connected to a radiology information system (RIS) 29, which generally manages radiation image information handled by the radiological department of the hospital along with other information. The RIS 29 is connected to a hospital information system (HIS) 31, which generally manages medical information within the hospital.

The image capturing apparatus 22 comprises an image capturing switch 72, a radiation source 74, a transceiver (wireless communication unit) 76, and a radiation source controller 78.

The transceiver 76 receives image capturing conditions from the console 28 by way of wireless communications, and transmits an image capturing completion signal, etc., to the console 28 by way of wireless communications. The transceiver 76 also is capable of performing wireless communications with the transceiver 48 of the radiation detecting cassette 24.

The radiation source controller 78 controls the radiation source 74 based on an image capturing start signal supplied from the image capturing switch 72 and image capturing conditions supplied from the transceiver 76. The radiation source 74 outputs radiation X under the control of the radiation source controller 78.

The cassette controller 46 of the radiation detecting cassette 24 comprises an address signal generator 80, an image memory 82, and a cassette ID memory 84.

The address signal generator 80 supplies address signals to the address decoder 60 of the line scanning driver 58 and to the address decoder 68 of the multiplexer 66 of the radiation detector 40. The image memory 82 stores radiation image information detected by the radiation detector 40. The cassette ID memory 84 stores cassette ID information for identifying the radiation detecting cassette 24.

The transceiver 48 receives a transmission request signal from the console 28 by way of wireless communications, and transmits the cassette ID information stored in the cassette ID memory 84 and the radiation image information stored in the image memory 82 to the console 28 by way of wireless communications.

The display device 26 comprises a receiver 90 for receiving radiation image information from the console 28, a display controller 92 for controlling display of the received radiation image information, and a display unit 94 for displaying radiation image information processed by the display controller 92.

The console 28 comprises a transceiver 96, an image capturing condition manager 98, an image processor (image processing unit) 100, an image memory 101, a patient information manager 102, and a cassette information manager 104.

The transceiver 96 transmits and receives, by way of wireless communications, necessary information including radiation image information to and from the image capturing apparatus 22, the radiation detecting cassette 24, and the display device 26. The image capturing condition manager 98 manages image capturing conditions required for the image capturing apparatus 22 to capture radiation images. The image processor 100 processes radiation image information transmitted from the radiation detecting cassette 24. The image memory 101 stores radiation image information processed by the image processor 100. The patient information manager 102 manages patient information of the patient 14 whose images are to be captured. The cassette information manager 104 manages cassette ID information transmitted from the radiation detecting cassette 24.

The console 28 may be located outside of the operating room 12, assuming that the console 28 can transmit and receive signals to and from the image capturing apparatus 22, the radiation detecting cassette 24, and the display device 26 by way of wireless communications.

The image capturing conditions refer to conditions for determining a tube voltage, a tube current, an irradiation time, etc., which are required to apply radiation X at an appropriate dose to an area of the patient 14 to be imaged. The image capturing conditions may include an area of the patient 14 to be imaged, an image capturing method, etc., for example. The patient information refers to information used for identifying the patient 14, such as the patient's name, gender, patient ID number, etc. Ordering information for ordering an image to be captured, including the image capturing conditions and the patient information, can be set directly via the console, 28 or can be supplied from an external source to the console 28 via the RIS 29.

The radiation image capturing system 10 according to the present embodiment is basically constructed as described above. Operations of the radiation image capturing system 10 shall be described below.

The radiation image capturing system 10 is installed in the operating room 12 and used whenever a radiation image of the patient 14 is required by surgeons 18 who are performing an operation on the patient 14. Before a radiation image of the patient 14 is captured, patient information of the patient 14 to be imaged is registered in the patient information manager 102 of the console 28. If an area of the patient 14 to be imaged and an image capturing method are already known, such conditions are registered as image capturing conditions in the image capturing condition manager 98. After completion of the above preparatory process, the surgeons 18 perform the operation on the patient 14.

For capturing a radiation image of the patient 14 during an operation, one of the surgeons 18 or a radiological technician places the radiation detecting cassette 24 between the patient 14 and the surgical table 16, with the irradiated surface 36 facing the image capturing apparatus 22. Then, after having moved the image capturing apparatus 22 to a position confronting the radiation detecting cassette 24, one of the surgeons 18 or a radiological technician turns on either one of the power supply switches 190 on respective side walls 192 of the radiation detecting cassette 24. When either one of the power supply switches 190 is turned on, the battery 44 starts supplying electric power to the radiation detector 40, the cassette controller 46, and the transceiver 48. One of the surgeons 18 or a radiological technician then turns on the image capturing switch 72.

When the image capturing switch 72 is turned on, the radiation source controller 78 of the image capturing apparatus 22 requests the console 28 to transmit image capturing conditions via the transceivers 76, 96. Based on this request, the console 28 transmits image capturing conditions concerning the area of the patient 14 to be imaged to the image capturing apparatus 22 via the transceivers 96, 76. The image capturing conditions are registered in the image capturing condition manager 98. When the radiation source controller 78 receives the image capturing conditions, the radiation source controller 78 controls the radiation source 74 in order to apply radiation X at a given dose to the patient 14, in accordance with the image capturing conditions.

Radiation X that has passed through the patient 14 is applied to the grid 38, which removes scattered rays of the radiation X. Then, the radiation X is applied to the radiation detector 40 and converted into electric signals by the photoelectric conversion layer 51 of each of the pixels 50 of the radiation detector 40. The electric signals are stored as electric charges in the storage capacitors 53 (see FIG. 5). The stored electric charges, which represent radiation image information of the patient 14, are read from the storage capacitors 53 according to address signals, which are supplied from the address signal generator 80 of the cassette controller 46 to the line scanning driver 58 and to the multiplexer 66.

Specifically, in response to the address signal supplied from the address signal generator 80, the address decoder 60 of the line scanning driver 58 outputs a selection signal so as to select one of the switches SW1, which supplies the control signal Von to the gates of the TFTs 52 connected to the gate line 54 corresponding to the selected switch SW1. In response to the address signal supplied from the address signal generator 80, the address decoder 68 of the multiplexer 66 outputs a selection signal, which operates to successively turn on the switches SW2 so as to switch between the signal lines 56, for thereby reading, through the signal lines 56, electric charges stored in the storage capacitors 53 of the pixels 50 connected to the selected gate line 54.

Electric charges read from the storage capacitors 53 of the pixels 50, which are connected to the selected gate line 54, are amplified by respective amplifiers 62, sampled by the sample and hold circuits 64, and supplied to the multiplexer 66. Based on the supplied electric charges, the multiplexer 66 generates and supplies a radiation image signal to the A/D converter 70, which converts the radiation image signal into a digital signal. The digital signal, which represents the radiation image information, is stored in the image memory 82 of the cassette controller 46.

Similarly, the address decoder 60 of the line scanning driver 58 successively turns on the switches SW1 to switch between the gate lines 54 according to the address signal supplied from the address signal generator 80. The electric charges stored in the storage capacitors 53 of the pixels 50, which are connected to the successively selected gate lines 54, are read through the signal lines 56, and processed by the multiplexer 66 and the A/D converter 70 into digital signals, whereupon the digital signals are stored in the image memory 82 of the cassette controller 46.

The radiation image information, represented by digital signals stored in the image memory, is transmitted through the transceiver 48 to the console 28 by way of wireless communications.

The radiation image information transmitted to the console 28 is received by the transceiver 96, processed by the image processor 100, and then stored in the image memory 101 in association with the patient information of the patient 14 registered in the patient information manager 102.

Radiation image information processed by the image processor 100 is transmitted from the transceiver 96 to the display device 26. In the display device 26, the receiver 90 receives the radiation image information, and the display controller 92 controls the display unit 94 so as to display a radiation image based on the radiation image information. The surgeons 18 perform an operation on the patient 14 while visually confirming the radiation image displayed on the display unit 94.

After the radiation image has been captured, one of the surgeons 18 or a radiological technician turns off either one of the power supply switches 190, to thereby cause the battery 44 to stop supplying electric power to the radiation detector 40, the cassette controller 46, and the transceiver 48.

According to the present embodiment, as described above, the power supply switches 190 are mounted on respective side walls 192 of the casing 34, which are held out of contact with the patient 14 during the time that the radiation image capturing system 10 captures a radiation image of the patient 14. Since the power supply switches 190 are prevented from coming into contact with the patient 14, even if the patient 14 moves when a radiation image of the patient is captured, the radiation image capturing system 10 can more reliably capture radiation images of the patient 14.

The power supply switches 190 are mounted on respective side walls 192 of the casing 34, which are held out of contact with the patient 14 at a time when the radiation image capturing system 10 captures a radiation image of the patient 14. When one of the surgeons 18 or a radiological technician turns either one of the power supply switches 190 on or off, the battery 44 starts or stops supplying electric power to the radiation detector 40, the cassette controller 46, and the transceiver 48. Therefore, it is possible to turn the power supply switch 190 on immediately before the radiation image capturing system 10 captures a radiation image of the patient 14, whereby power consumption of the battery 14 is reliably minimized.

In the illustrated embodiment, the battery 44 starts or stops supplying electric power to the radiation detector 40, the cassette controller 46, and the transceiver 48 when one of the surgeons 18 or a radiological technician turns either one of the power supply switches 190 on or off. However, as long as the power consumption of the battery 14 is minimized, the battery 44 may start or stop supplying electric power to any one or two of the radiation detector 40, the cassette controller 46, and the transceiver 48. Specifically, the battery 44 may supply electric power to the cassette controller 46 and the transceiver 48 at all times, while the battery starts or stops supplying electric power to only the radiation detector 40 when one of the surgeons 18 or a radiological technician turns either one of the power supply switches 190 on or off.

Furthermore, signals are transmitted and received by way of UWB wireless communications between the radiation detecting cassette 24 and the console 28, between the radiation detecting cassette 24 and the image capturing apparatus 22, between the image capturing apparatus 22 and the console 28, and between the console 28 and the display device 26. In other words, since cables for transmitting and receiving signals are not connected between the image capturing apparatus 22, the radiation detecting cassette 24, the display device 26, and the console 28, such cables are not placed on the floor of the operating room 12 where they would become obstacles to the operation performed by the surgeons 18, the radiological technician, or to other staff members present in the operating room 12. Accordingly, the surgeons 18, the radiological technician, and other staff members in the operating room 12 can perform work more efficiently. UWB wireless communications also make it possible to reduce power consumption, increase fading resistance, and increase communication rates, compared with other types of wireless communications.

The radiation image capturing system 10 according to the illustrated embodiment captures a radiation image of the patient 14 when one of the surgeons 18 or a radiological technician turns on the image capturing switch 72. However, the radiation image capturing system 10 may also be configured to capture a radiation image of the patient 14 when one of the surgeons 18 or a radiological technician operates the console 28.

In the radiation image capturing system 10 according to the illustrated embodiment, the radiation detector 40, which is housed in the radiation detecting cassette 24, directly converts the dose of applied radiation X into an electric signal via the photoelectric conversion layer 51. However, the radiation image capturing system 10 may employ a radiation detector including a scintillator for converting the applied radiation X into visible light together with a solid-state detecting device made up of amorphous silicon (a-Si) or the like for converting the visible light into electric signals (see Japanese Patent No. 3494683).

Alternatively, the radiation image capturing system 10 may employ a light-conversion radiation detector for acquiring radiation image information, which operates as follows. When radiation is applied to a matrix of solid-state detecting devices, the solid-state detecting devices store an electrostatic latent image therein depending on the dose of applied radiation. For reading the stored electrostatic latent image, reading light is applied to the solid-state detecting devices, thereby causing the solid-state detecting devices to generate an electric current representing the radiation image information. When erasing light is applied to the radiation detector, radiation image information, representing a residual electrostatic latent image, is erased from the radiation detector. Thus, the radiation detector can be reused (see Japanese Laid-Open Patent Publication No. 2000-105297).

When the radiation detecting cassette 24 is used in the operating room 12 or the like, the radiation detecting cassette 24 may be subjected to adhesion of blood, contamination, etc. However, when the radiation detecting cassette 24 is designed to have a waterproof and hermetically-sealed structure, and is sterilized and cleaned as necessary, one radiation detecting cassette 24 can be used repeatedly.

The radiation detecting cassette 24 is not limited to use in the operating room 12, and may be used for a medical examination and a round in the hospital.

Also, the radiation detecting cassette 24 may communicate with external devices via optical wireless communication using infrared light or the like, instead of general wireless communication using radio wave.

Figure 7:
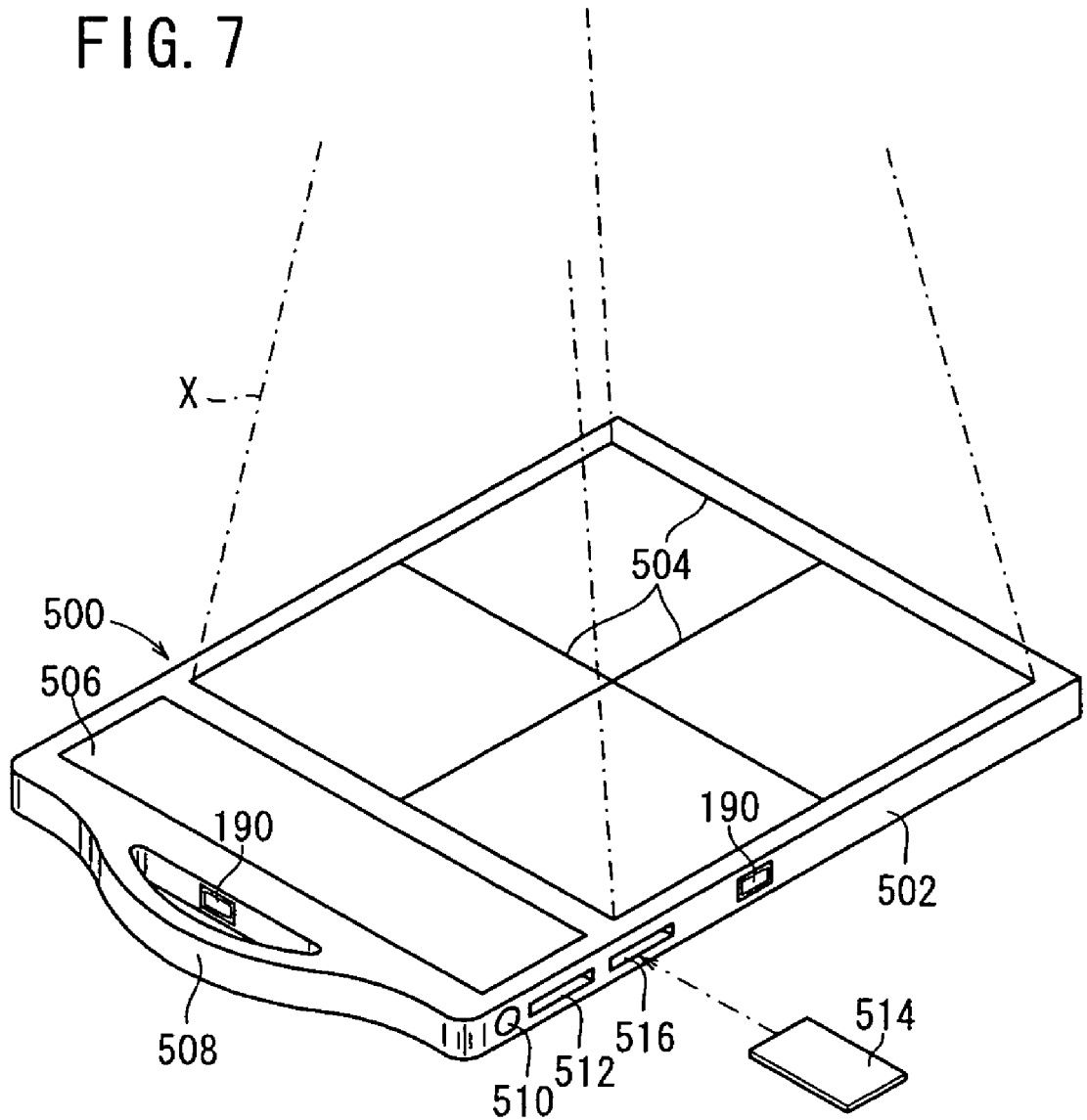
FIG. 7 is a perspective view showing a radiation detecting cassette according to another embodiment of the present invention.

Preferably, the radiation detecting cassette 500 may be constructed as shown in FIG. 7.

Specifically, the radiation detecting cassette 500 includes a guiding line 504 drawn on the radiation-irradiated surface of a casing 502, the guiding line 504 serving as a reference for setting a captured area and a captured position. Using the guiding line 504, a subject (patient 14) can be positioned with respect to the radiation detecting cassette 500, and an area irradiated with the radiation X can be set, thereby recording radiation image information on an appropriate captured area.

The radiation detecting cassette 500 is provided with a display section 506 on an area thereof other than the captured area, for displaying various information about the radiation detecting cassette 500. The information which is displayed on the display section 506, includes ID information of the patient 14 whose radiation image information is to be recorded on the radiation detecting cassette 500, the number of times the radiation detecting cassette 500 has been used, an accumulated exposed radiation dose, a charging state (remaining battery level) of a battery 44 in the radiation detecting cassette 500, image capturing conditions of radiation image information, and a positioning image of the patient 14 with respect to the radiation detecting cassette 500. In this case, a technician confirms the patient 14 based on the ID information displayed on the display section 506, for example, and also previously confirms that the radiation detecting cassette 500 is placed in a usable state. Then, the technician positions a desired captured area of the patient 14 with respect to the radiation detecting cassette 500 based on the displayed positioning image, thereby capturing appropriate radiation image information.

Also, the radiation detecting cassette 500 is provided with a handgrip 508, whereby it is easier to handle and carry the radiation detecting cassette 500.

Preferably, the radiation detecting cassette 500 may have, on a side thereof, an input terminal 510 for an AC adapter, a USB (Universal Serial Bus) terminal 512, and a card slot 516 for inserting a memory card 514.

When the charging function of the battery 44 in the radiation detecting cassette 500 becomes deteriorated, or when there is not enough time to fully charge the battery 44, the input terminal 510 is connected to the AC adapter to externally supply the radiation detecting cassette 500 with electric power, thereby enabling the radiation detecting cassette 500 to be used immediately.

The USB terminal 512 or the card slot 516 may be used when the radiation detecting cassette 500 cannot transmit and receive information to and from external devices such as the console 28 via wireless communication. Specifically, by connecting a cable to the USB terminal 512, the radiation detecting cassette 500 can transmit and receive information to and from the external devices via wire communication. Alternatively, the memory card 514 is inserted into the card slot 516, and necessary information is recorded on the memory card 514. After that, the memory card 514 is removed from the card slot 516, and the memory card 514 is inserted into the external device, thereby enabling information to be transferred.

Figure 8:
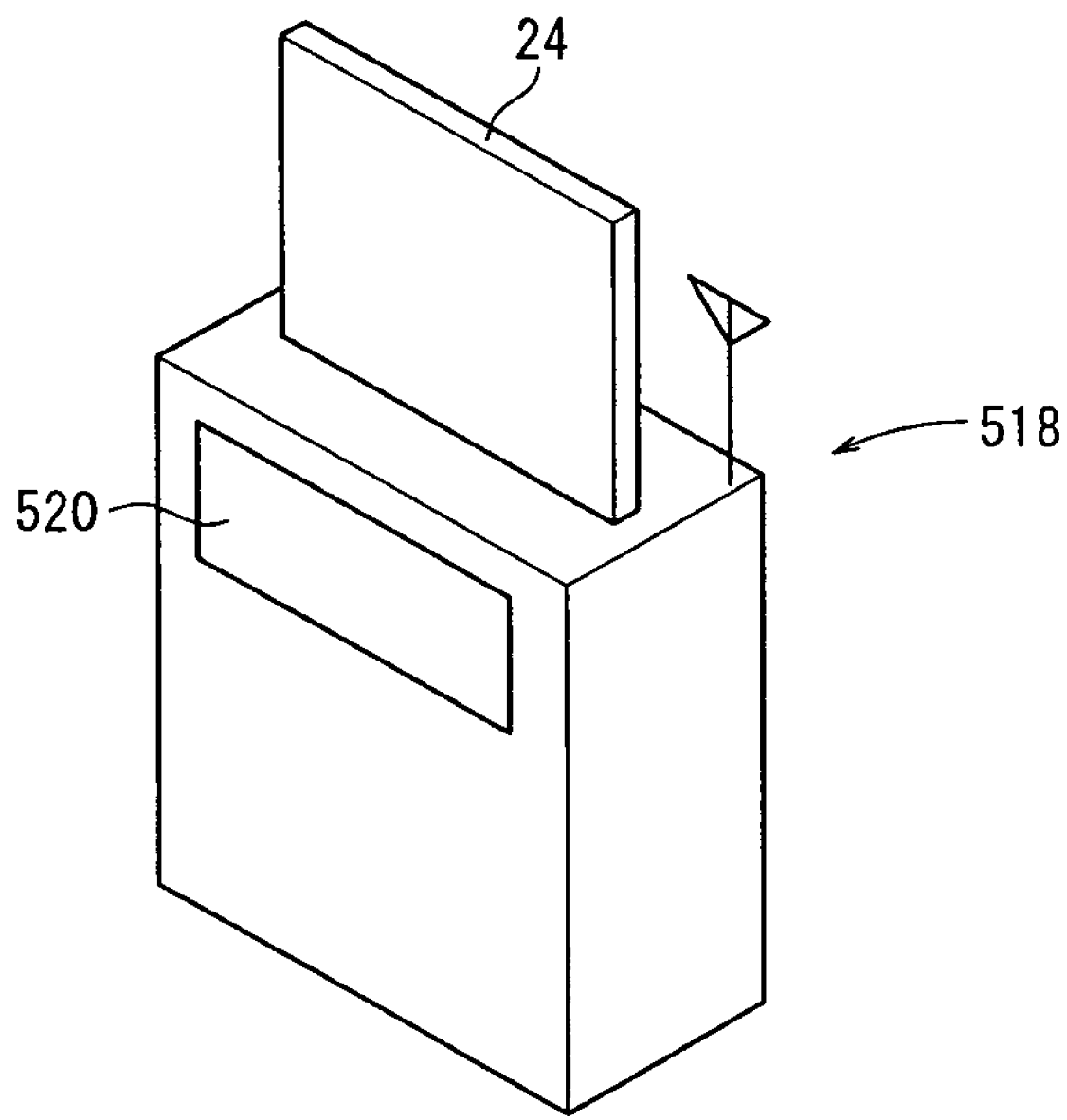
FIG. 8 is a perspective view showing a cradle which charges the radiation detecting cassette.

Preferably, a cradle 518 may be disposed in the operating room 12 or at a desired place in the hospital, into which the radiation detecting cassette 24 is inserted to charge the internal battery 44, as shown in FIG. 8. In this case, in addition to charging the battery 44, the cradle 518 may transmit and receive necessary information to and from external devices such as RIS 29, HIS 31, the console 28, etc. by way of wireless or wire communications of the cradle 518. The information may include radiation image information which is recorded on the radiation detecting cassette 24 inserted into the cradle 518.

Also, the cradle 518 may be provided with a display section 520. The display section 520 may display necessary information including a charging state of the inserted radiation detecting cassette 24 and radiation image information acquired from the radiation detecting cassette 24.

Further, a plurality of cradles 518 may be connected to a network. In this case, information about charging states of radiation detecting cassettes 24 inserted in respective cradles 518 can be collected through the network, and the radiation detecting cassette 24 in a usable state can be located.

Although a certain preferred embodiment of the present invention has been shown and described in detail, it should be understood that various changes and modifications may be made to the embodiment without departing from the scope of the invention as set forth in the appended claims.

What is claimed is:

1. A radiation detecting cassette comprising:
   a radiation conversion panel for detecting-radiation that has passed through a subject and converting the detected radiation into radiation image information;
   a wireless communication unit for performing wireless communications with an external source;
   a battery for energizing said radiation conversion panel and said wireless communication unit; and
   a plurality of switches for controlling supply of electric power from said battery to said radiation conversion panel and to said wireless communication unit;
   wherein said radiation conversion panel, said wireless communication unit, and said battery are housed in a substantially rectangular casing;
   said switches are disposed on respective side walls of said casing, said side walls defining surfaces other than a surface on which the subject is in contact, such that the side walls remain out of contact with the subject when a radiation image of the subject is captured; and
   when one of said switches is operated, said battery starts or stops supplying electric power to at least one of said wireless communication unit or said radiation conversion panel.

2. A radiation detecting cassette according to claim 1, wherein said wireless communication unit performs UWB wireless communications with said external source.

3. A radiation detecting cassette according to claim 1, wherein said switches are disposed centrally on said respective side walls of said casing.

4. A radiation detecting cassette according to claim 1, wherein said battery supplies electric power to said wireless communication unit at all times, and starts or stops supplying electric power to said radiation conversion panel when at least one of said switches is operated.

5. A radiation detecting cassette according to claim 1, wherein said casing is made of a material permeable to said radiation, and said radiation conversion panel acquires said radiation image information by directly converting said radiation into an electric signal.

6. A radiation image capturing system comprising:
   a radiation detecting cassette comprising:
      a radiation conversion panel for detecting radiation that has passed through a subject and converting the detected radiation into radiation image information;
      a wireless communication unit for performing wireless communications with an external source;
      a battery for energizing said radiation conversion panel and said wireless communication unit; and
      a plurality of switches for controlling supply of electric power from said battery to said radiation conversion panel and to said wireless communication unit;
      wherein said radiation conversion panel, said wireless communication unit, and said battery are housed in a substantially rectangular casing;
      said switches are disposed on respective side walls of said casing, said side walls defining surfaces other than a surface on which the subject is in contact, such that the side walls remain out of contact with the subject when a radiation image of the subject is captured; and
      when one of said switches is operated, said battery starts or stops supplying electric power to at least one of said wireless communication unit or said radiation conversion panel;
   a radiation source for outputting said radiation; and
   a controller for controlling said radiation source and said radiation detecting cassette.

7. A radiation image capturing system according to claim 6, wherein said wireless communication unit transmits said radiation image information converted by said radiation conversion panel to said controller by wireless communications.

8. A radiation image capturing system according to claim 6, further comprising:
   an image capturing apparatus having said radiation source; and
   a display device for displaying a radiation image based on said radiation image information;
   wherein UWB wireless communications are performed between said radiation detecting cassette and said controller, between said radiation detecting cassette and said image capturing apparatus, between said image capturing apparatus and said controller, and between said controller and said display device.

* * * * *